United States Patent [19]

Benton

[11] 4,058,842

[45] Nov. 15, 1977

[54] CONTROL ASSEMBLY FOR POWER DISTRIBUTION TRANSFORMERS

[75] Inventor: Ronald E. Benton, Athens, Ga.

[73] Assignee: Westinghouse Electric Corporation, Pittsburgh, Pa.

[21] Appl. No.: 622,916

[22] Filed: Oct. 16, 1975

[51] Int. Cl.² .............................................. H02H 7/04

[52] U.S. Cl. .......................................... 361/38; 335/6

[58] Field of Search ..................... 317/157.6, 14 J, 15; 335/6; 74/526; 200/329, 330, 332, 335

[56] References Cited

U.S. PATENT DOCUMENTS

| | | | |
|---|---|---|---|
| 3,176,107 | 3/1965 | Temple | 74/526 |
| 3,983,454 | 9/1976 | Cotton et al. | 335/6 |

*Primary Examiner*—Harold Broome

*Attorney, Agent, or Firm*—D. R. Lackey

[57] ABSTRACT

An assembly of control handles for attachment to a distribution transformer containing a secondary circuit breaker. The assembly includes a stop plate which is located against the outside of the transformer tank. An operating handle and an overload control handle are positioned for rotation between projections on the stop plate. The operating handle is attached to the outer portion of an operating shaft which extends through an opening in the stop plate. The operating shaft also extends through a sealed bearing which prevents leakage of the fluid dielectric contained within the transformer tank. The inner portion of the operating shaft is connected to an operating arm which is attached to the circuit breaker opeating lever. The overload handle is attached to the outer portion of an overload shaft which extends through an opening in the stop plate and through a sealed bearing. The inner portion of the overload shaft is connected to an overload arm. The oveload arm is attached to a remote control cable which runs to the circuit breaker and is attached to means on the circuit breaker for modifying the trip characteristics of the circuit breaker. The projections from the stop plate are symmetrical about an axis which extends through the openings in the stop plate.

5 Claims, 5 Drawing Figures

CONTROL ASSEMBLY FOR POWER DISTRIBUTION TRANSFORMERS

BACKGROUND OF THE INVENTION

1. Field of the Invention

This invention relates, in general, to electrical apparatus and more specifically, to apparatus for externally controlling a secondary circuit breaker disposed within the tank of a distribution transformer.

2. Description of the Prior Art

Circuit breakers enclosed within a distribution transformer tank and connected to the secondary windings thereof have been used primarily to protect the distribution transformer from abnormally high load currents. Such breakers usually include means for opening and closing the circuit breaker and for resetting the circuit breaker after it has been tripped. Such circuit breakers also include an emergency overload adjustment or control which may be moved to change the tripping characteristics of the circuit breaker. That is, the emergency overload control may be moved to increase the amount of current which may pass through the circuit breaker before it is tripped. It is sometimes desirable to increase the rating of a circuit breaker under temporary conditions to prevent a power outage, even though the amount of power delivered by the distribution transformer is greater than that for which it was primarily designed.

Distribution transformers equipped with secondary circuit breakers usually contain a signal light which provides an indication that the transformer has been moderately overloaded. When the transformer has been called upon to supply power above a predetermined level, the signal light is turned on and remains on until reset by a lineman. The signal light is turned on usually at a current output which is below the current output necessary to trip the breaker. Thus, such signal lights provide an indication of which transformers have been operating near the point at which circuit interruption may occur.

For various reasons, control of a circuit breaker is required from the outside of the transformer enclosure. When working on the secondary portion of the distribution system, it is often desirable to disconnect the transfromer by tripping the breaker. Thus, means located on the outside of the transformer tank is desirable to trip circuit breaker. Once the circuit breaker has been tripped, either purposely or by an overload current, it must be capable of being reset to reapply the power to the secondary distribution lines. Therefore, such a means located on the outside of the transformer tank is desirable. In addition, under temporary conditions, it may be desirable to increase the current carrying capacity of the circuit breaker from outside the transformer tank. Therefore, conventional control assemblies for distribution transformers having secondary circuit breakers include means located on the outside of the transformer tank for changing the value of current at which the breaker trips. This is usually accomplished by a mechanical adjustment on the bimetallic element used to trigger the circuit breaker.

A form of prior art control assembly for distribution transformers having secondary circuit breakers enclosed therein utilizes a control handle which are disposed around the signal light. Although the signal light and the control handle use only one opening in the transformer tank with such an arrangement, the complexity thereof and the cost of the die-cast components required thereby detracts from the economical benefits of such a combined device. In addition, it is difficult for these conventional assemblies to maintain an oil-tight seal between the inside and the outside of the transformer tank. Thus, it is desirable, and it is an object of this invention, to provide a control assembly for distribution transformers which is more economical, more reliable, and less complicated than previously used control assemblies for such transformers.

SUMMARY OF THE INVENTION

There is disclosed herein a new and useful control assembly for distribution transformers containing an enclosed secondary circuit breaker. A stop plate, an operating handle, and an overload handle are located on the outside of the transformer tank. The handles are attached to outer portions of shafts which extend through openings in the plate and through sealed bushings which also function to hold the stop plate against the outside of the transformer tank.

The stop plate contains projections or stops which extend from the surface of the stop plate to limit the amount of movement of the operating and overload handles. The stops on the stop plate which are associated with the operating handle and with the overload handle are symmetrical about an axis through the openings in the stop plate.

On the inner portions of the shafts to which the handles are attached, arms are connected which are suitably coupled to the circuit breaker within the transformer tank. The arm attached to the operating handle is connected to the lever on the circuit breaker which opens and closes the breaker contacts. The arm which is connected to the shaft associated with the overload handle is connected to a remote control cable which moves an adjustment on the circuit breaker to change the value of the overload current required to trip the circuit breaker. Thus, control of the circuit breaker from outside the transformer enclosure is provided through two nonconcentric shafts which extend through sealed bushings in the transformer tank. The signal light assembly is mounted separately from the stop plate and handle assembly, thereby eliminating the complicated concentric handle and signal light arrangements used according to conventional prior art techniques.

BRIEF DESCRIPTION OF THE DRAWINGS

Further advantages and uses of this invention will become more apparent when considered in view of the following detailed description and drawing, in which.

DESCRIPTION OF THE PREFERRED EMBODIMENTS

Figure 1:
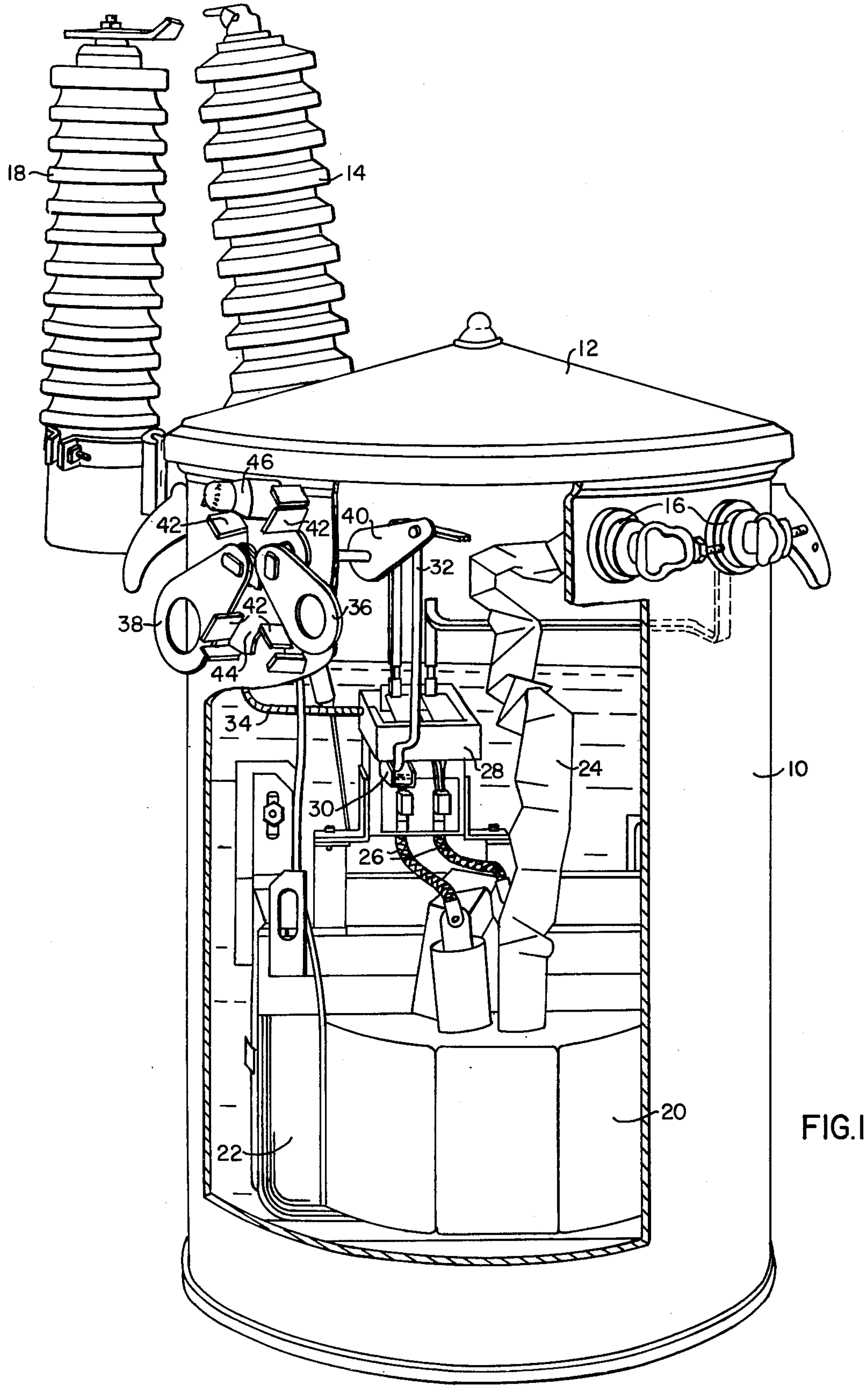
FIG. 1 is a cut-away view of a power distribution transformer having a breaker control assembly constructed according to this invention.

Throughout the following description, similar reference characters refer to similar elements or members in all of the figures of the drawing.

Referring now to the drawing, and to FIG. 1 in particular, there is shown a cut-away view of a distribution transformer constructed according to the teachings of this invention. The transformer includes the transformer tank 10 and the tank cover 12 which supports the high-voltage bushing 14. The low-voltage bushings 16 and the lightning arrester 18 are supported from the side of the tank 10. The tank encloses a winding structure 20 which is disposed in inductive relationship with the magnetic core 22. Various winding leads extend to the bushings on the transformer enclosure, such as the winding lead 24. In addition, the secondary circuit of the winding structure 20 is connected by the leads 26 through the circuit breaker 28 to the other low-voltage bushings on the transformer enclosure.

The circuit breaker 28 is constructed similar to the circuit breaker disclosed in U.S. Pat. application Ser. No. 496,800, which is assigned to the assignee of this invention. However, other types of circuit breakers may be used within the scope of this invention. Circuit breakers for use in power distribution transformers include a lever, such as the lever 30, which may be moved up and down to open and close and reset the circuit breaker contacts. In addition to the opening, closing and resetting operations able to be performed on the circuit breaker 28, an overload adjustment is also possible. Other circuit breakers which include operating handles and overload adjustments are described in U.S. Pat. Nos. 2,686,242 and 3,525,058, which are also assigned to the assignee of this invention.

In FIG. 1, the lever 30 is moved by the linkage 32 and the overload adjustment is moved by the cable 34. Initial movement of the cable 34 and the linkage 32 from outside the transformer enclosure is accomplished by movement of the emergency overload control handle 36 and the breaker operating handle 38, respectively. These handles are connected to shafts which extend through the transformer enclosure and are connected to suitable arms, such as the operating arm 40, which are coupled to the appropriate control cable or linkage. Movement of the handles 36 and 38 is restricted by the projections or stops 42 which extend from the stop plate 44. The signal light 46 is mounted separately to the transformer tank 10 and connected electrically to contacts in the circuit breaker 28.

Figure 2:
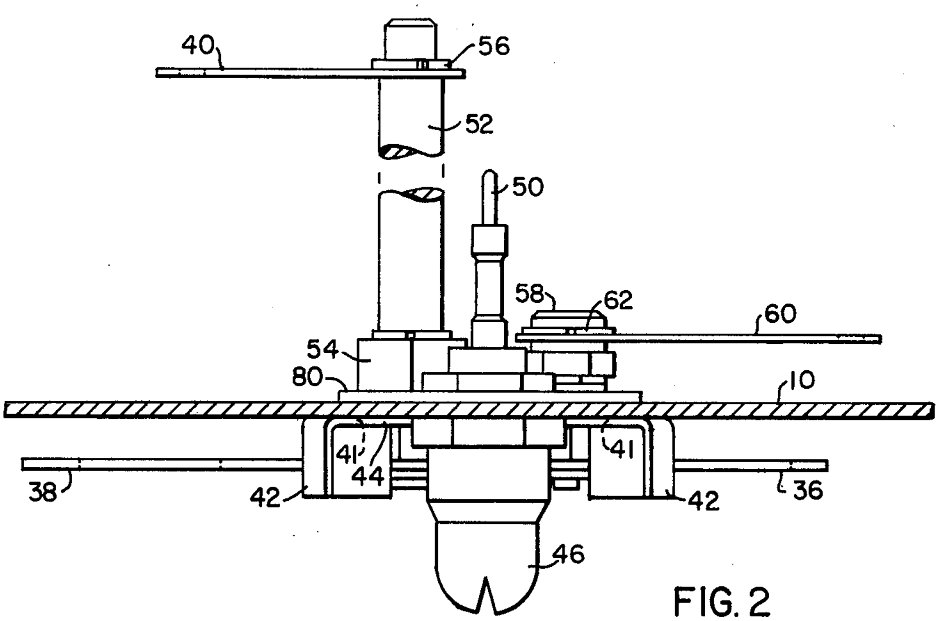
FIG. 2 is a top view of the control assembly shown in FIG. 1.

FIG. 2 is a top view of the control assembly mounted on the side of the tank wall 10. The signal light assembly 46 extends through an opening in the tank wall 10 and is connected, by the wire 50, to the circuit breaker. The operating handle 38 is attached to the operating shaft 52 on the outside of the tank wall 10. The shaft 52 extends through the sealed bearing 54 and is attached to the operating arm 40. The operating arm 40 is held in place by the snap ring or retaining ring 56 and is connected in such a manner that rotation of the shaft 52 rotates the operating arm 40 around the axis of the shaft. Thus, when the operating handle 38 at the outside of the transformer tank wall 10 is moved, the operating arm 40 is moved in a similar direction.

The shaft 58 is attached to the overload handle 36 on the outside of the tank wall 10 and to the overload arm 60 on the inside of the tank wall 10. The snap ring 62 is used to keep the arm 60 fixed on the shaft 58. Consequently, when the overload handle 36 is moved in one direction, the overload arm 60 is moved in the same direction. The amount of rotation or movement of the handles 36 and 38 is restricted by the projections or stops 42 which extend from the stop plate 44. The stop plate 44 also contains openings, such as the openings 41, through which the shafts and bearings extend.

Figure 3:
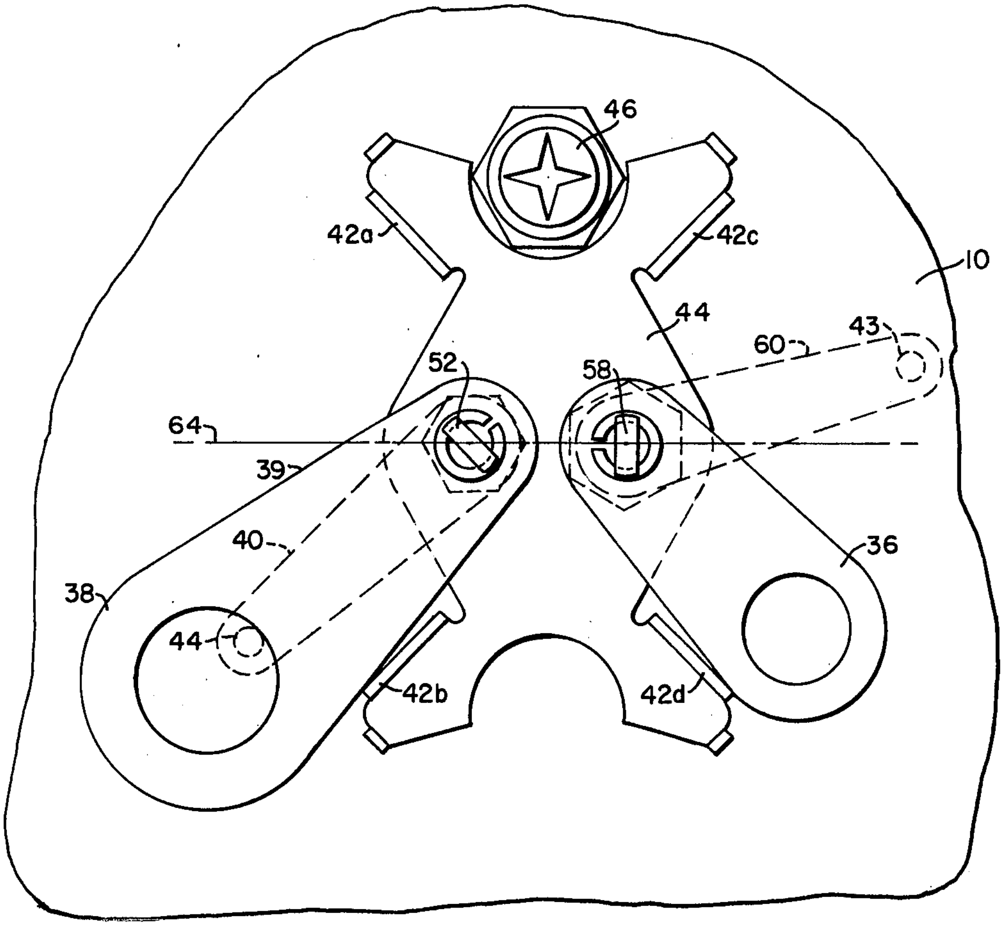
FIG. 3 is a plan view of the outside of the control assembly shown in FIG. 1.

FIG. 3 is a front view of the portion of the control assembly which is located on the outside of the transformer tank 10. The signal light assembly 46 is also illustrated in FIG. 3. The stop plate 44 is symmetrical about the axis 64 which extends through the center of the openings in the stop plate 44. That is, the stops *42a* and *42b* are symmetrical about the axis 64 with respect to each other, and the stops *42c* and *42d* and also symmetrical about the same axis. The symmetry of the stop plate 44 provides a manufacturing convenience since the entire assembly may be inverted to provide either clockwise or counterclockwise operating direction depending upon customer requirements.

The operating arm 40, which is shown in phantom in FIG. 3, moves simultaneously with a movement of the operating handle 38. Similarly, the overload arm 60, which is also shown in phantom, moves simultaneously with the overload handle 36. The exact angle of orientation of the arms with respect to their handles may be changed without departing from the scope of the invention. For example, the overload arm 60 may be keyed to the overload shaft 58 so that it is pointing in the same general direction as the overload handle 36, similar to the relationship between the operating handle 38 and the operating arm 40.

The stops *42a, 42b, 42c* and *42d* shown in FIG. 3 limit the amount of rotation of the handles 36 and 38 to approximately 80°. For example, the handle 38 may be rotated clockwise until the edge 39 thereof comes into contact with the stop *42a*. Depending upon the amount of travel necessary to properly manipulate the circuit breaker, the stops 42 on the stop plate 44 may be positioned to provide more or less rotation of the handles 36 and 38 than 80°. The amount of travel is also controlled by the position of the arm openings 41 and 43 and the shape of the handles 36 and 38.

Figure 4:
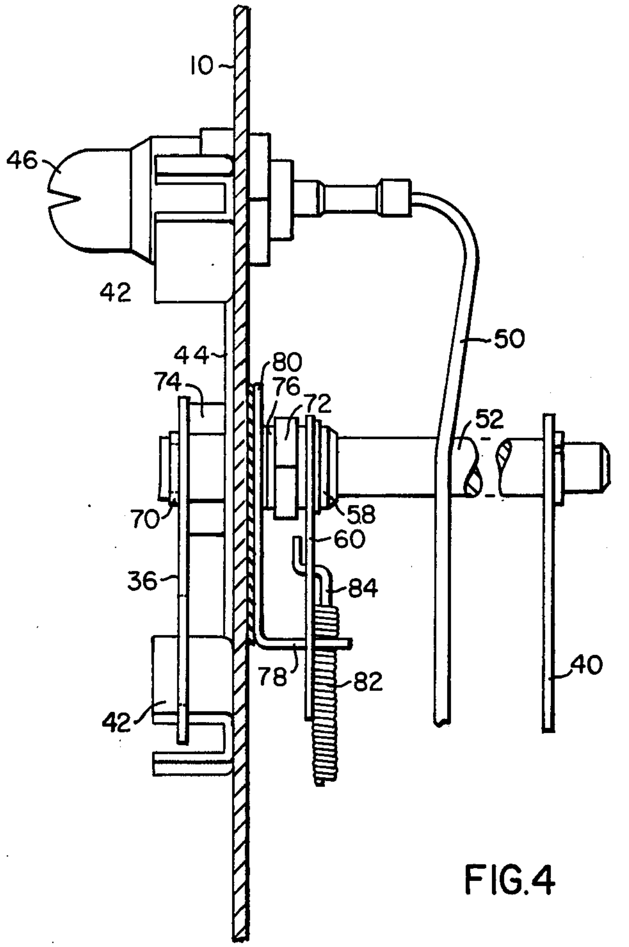
FIG. 4 is a side view of the control assembly shown in FIG. 1.

FIG. 4 is a side elevational view of the control assembly shown in FIG. 1. The signal light assembly 46 is mounted on the tank wall 10 at a location above the stop plate 44. The operating shaft 52 is shown extending beyond the overload shaft 58 and connected to the operating arm 40. The overload handle 36 is connected to the outer portion of the overload shaft 58 and is held in place by the snap ring 70. The overload shaft 58 extends through the sealed bearing 72 which has threads which are engaged with the nut 74 on the outside of the transformer tank 10. The shoulder area of the bearing 72 forces the lock washer 76 against the cable holder 78 and the gasket 80.

The overload control cable 82 consists of a concentric shield around an inner wire 84 which is attached to the overload arm 60. When the overload handle 36 is raised upwardly, the overload lever 60 raises and pulls the inner wire 84 from the overload control cable 82 and changes the overload adjustment on the circuit breaker.

Figure 5:
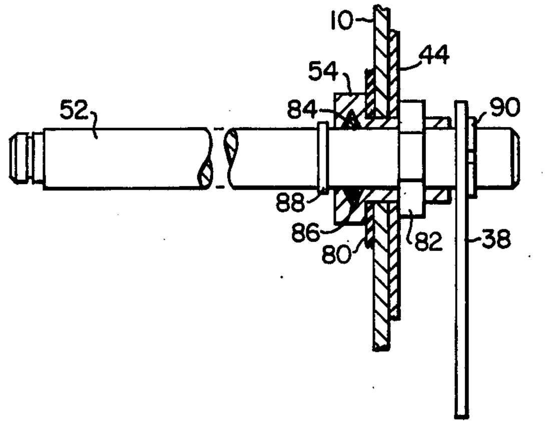
FIG. 5 is a partial cross-sectional view of the control assembly shown in FIG. 1.

FIG. 5 illustrates in more detail the construction of the sealed bearings which hold the stop plate to the tank wall and through which the shafts extend. Both the overload shaft 58 and the operating shaft 52 extend through similar bearings, thus the illustration in FIG. 5 of the operating shaft 52 is illustrative of the sealing arrangement used for the shaft 58. However, a lock washer may be positioned between the bearing 54 and the tank wall 10 without departing from the scope of the invention.

As shown in FIG. 5, the bearing 54 is located through an opening in the tank wall 10 and an opening in the stop plate 44. The nut 82 securely holds these members together and forces the shoulder area of the bearing 54 against the gasket 80 to seal the bearing 54 with respect to the tank wall 10. An O-ring 84 is positioned within a groove 86 located around the inside of the bearing 54. The O-ring seals the shaft 52 with respect to the inside and outside surfaces of the tank wall 10. Lateral movement of the shaft 52 is prevented by the snap ring 88 and by the snap ring 90 which also maintains the attachment of the operating handle 38 to the shaft 52.

The control assembly disclosed herein can be conveniently constructed from common components without the need for die-cast or molded components which are costly and subject to breakage under adverse conditions. In addition, since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A control assembly for distribution power transformers containing a circuit breaker, comprising:
   - a stop plate having first and second openings therein, said stop plate being located on the outside of the transformer enclosure, said stop plate having first and second projections extending therefrom in radial spaced relation from said first opening and third and fourth projections extending therefrom in radial spaced relation from said second opening;
   - a breaker operating shaft having inner and outer portions and extending through said first opening;
   - a first sealed bearing surrounding the portion of said operating shaft which passes through said first opening in said stop plate and through an opening in said transformer enclosure;
   - a breaker overload shaft having inner and outer portions and extending through said second opening;
   - a second sealed bearing surrounding the portion of said overload shaft which passes through said second opening in said stop plate and through an opening in said transformer enclosure;
   - an operating handle attached to said outer portion of said operating shaft and aligned for rotation between said first and second projections of said stop plate;
   - an overload handle attached to said outer portion of said overload shaft and aligned for rotation between said third and fourth projections of said stop plate;
   - an operating arm attached to said inner portion of said operating shaft;
   - said circuit breaker having a contact lever;
   - means for connecting said operating arm to said contact lever such that rotation of said operating handle between said first and second projections will cause said contact lever on the circuit breaker to move;
   - said circuit breaker having overload means for changing the trip-current characteristics of said circuit breaker;
   - an overload arm attached to the inner portion of the overload shaft; and
   - means for connecting said overload arm to said overload means such that rotation of said overload handle between said third and fourth projections will cause said overload means to move.

2. The control assembly of claim 1 wherein the first and second projections on the stop plate are positioned to permit a rotation of the operating handle of approximately 80°.

3. The control assembly of claim 1 wherein the third and fourth projections on the stop plate are positioned to permit a rotation of the overload handle of approximately 80°.

4. The control assembly of claim 1 wherein the first and second projections on the stop plate are located symmetrically about a centerline of the stop plate, and wherein the third and fourth projections on the stop plate are located symmetrically about said centerline.

5. The control assembly of claim 1 wherein the sealed bearings support the stop plate against the transformer enclosure.

* * * * *